(12) United States Patent
Mohan et al.

(10) Patent No.: US 10,963,227 B2
(45) Date of Patent: Mar. 30, 2021

(54) TECHNIQUE FOR TRANSFORMING A STANDARD MESSAGING COMPONENT TO A CUSTOMIZED COMPONENT

(71) Applicant: SAP SE, Walldorf (DE)

(72) Inventors: Mayur Belur Mohan, Bangalore (IN); Harshavardhan Jegadeesan, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/453,190

(22) Filed: Jun. 26, 2019

(65) Prior Publication Data

US 2020/0409669 A1    Dec. 31, 2020

(51) Int. Cl.
*G06F 8/36* (2018.01)
*G06F 8/51* (2018.01)
*G06F 8/60* (2018.01)
*G06F 8/71* (2018.01)

(52) U.S. Cl.
CPC .................. *G06F 8/36* (2013.01); *G06F 8/51* (2013.01); *G06F 8/60* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 6,738,975 B1* | 5/2004 | Yee | ........................ | G06F 9/541 |
| | | | | 719/310 |
| 2014/0143830 A1* | 5/2014 | Lim | ........................ | G06F 16/93 |
| | | | | 726/1 |
| 2014/0201418 A1* | 7/2014 | Turner | .................... | H04L 67/02 |
| | | | | 710/313 |
| 2019/0065351 A1* | 2/2019 | Rakhmilevich | ..... | G06F 11/3692 |
| 2020/0125948 A1* | 4/2020 | Modi | .................... | G06N 3/0454 |
| 2020/0167141 A1* | 5/2020 | Kulkarni | ................... | G06F 8/61 |

OTHER PUBLICATIONS

Yeoh, "Using JUnit to automate unit testing regression of Adapter Module", 2016, blogs, https://blogs.sap.com/2016/02/05/using-junit-to-automate-unit-testing-regression-of-adapter-module/ (Year: 2016).*
Oracle, "The Java EE 6 Tutorial", 2016, Oracle, https://docs.oracle.com/javaee/6/tutorial/doc/gjban.html (Year: 2016).*
Cobra, About COBRA, 2016, OIS at http://www.ois.com/Products/about-corba.html (Year: 2016).*
Oracle, "The Java EE 6 Tutorial: Injecting Beans", 2016, Oracle at https://docs/oracle.com/javaee/6/tutorial/gjban.html (Year: 2016).*

* cited by examiner

*Primary Examiner* — Hossain M Morshed
(74) *Attorney, Agent, or Firm* — Buckley, Maschoff & Talwalkar LLC (57) ABSTRACT

A method and system including receiving selection of a component at a porting module; retrieving a source code for the selected component and a component configuration file for the selected component; receiving component data associated with the component; generating metadata associated with the received component based on the received component data; modifying the component configuration file of the selected component to generate a modified configuration file; generating an integration adapter by modifying the retrieved source code for the selected component with the generated metadata and the modified configuration file; and deploying the integration adapter. Numerous other aspects are provided.

17 Claims, 8 Drawing Sheets

502 ⟶ `<route id="<Adapter_Name>Consumer Route">`
  `<from id="MessageFlow_Consumer"`
  `uri="<component_schme>:<component_basepath>?key1=value1&key2=value2"/>`
  `<to uri="log:AdapterConsumerResponse" />`
`</route>`

FIG. 5A

```
<route id="MongoDbAdapterConsumeRoute">
                <from id="MessageFlow_Consumer"
uri="mongodb:mongo?collection=mycollection&database=mydb"/>
  220    222     <to uri="log:AdapterConunerResponse" />
</route>                              224
         506
```
(with braces: 220, 222 under the from line; 224 pointing to "to" line; 246 bracketing the whole route; 506 bracketing portion)

FIG. 5B

504 — `<route id=" Adapter_Name>ProducerRoute ">`
　　　　　`<from uri="timer:foo?repeatCount=1&period=5000" />`
　　　　　`<setBody>`
　　　　　　　`<constant>test</constant>`
　　　　　`</setBody>`
　　　　　`<to uri="<component_schme>:<component_basepath>?key1=value1&key2=value2"/>`
`</route>`

*FIG. 5C*

`<route id=" MongoDbProducerRoute ">`
　　　　　`<from uri="timer:foo?repeatCount=1&period=5000" />`
　　　　　`<setBody>`
　　　　　　　`<constant>test</constant>`
　　　　　`</setBody>`
　　　　　`<to uri="mongodb:mongoBean?database=mydb&collection=mycollection&operation=insert" />`
`</route>`

244 brackets the whole route; 220 points to "mongodb"; 222 points to the <to> uri; 226 points to </route>; 506 brackets the <to .../> line.

TECHNIQUE FOR TRANSFORMING A STANDARD MESSAGING COMPONENT TO A CUSTOMIZED COMPONENT

BACKGROUND

Cloud integration is the act of combining different cloud-based systems into an integral whole, or may refer to the joining of cloud-based systems with on-premises systems. The ultimate goal of cloud integration is to connect the disparate elements of various cloud and local resources into a single, ubiquitous environment that allows administrators to seamlessly access and manage applications, data, services and systems.

A cloud integration platform may synchronize data and applications across an enterprise. Cloud integration may include data integration (sharing or synchronizing data between data stores) and application integration (two or more applications share states, requests, commands and other mechanisms to implement organization processes).

The cloud integration platform may use middleware to facilitate integration. The middleware may provide integration for a large number of elements between two or more systems. However, some systems may be unable to use the middleware for reasons including, but not limited to, security.

Systems and methods are desired which support efficient integration of a data source with a data target using middleware.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Cloud-based applications, services or resources (collectively referred to as a "cloud-based product") are made available to users on demand via the internet from a cloud computing provider's cloud platform (which includes, for example, the server hardware and operating environment). Integration may automate complex workflows and reduce or eliminate redundant data that may lead to operational errors. Consequently, cloud integration may improve operational efficiency, flexibility and scalability, as well as reduce operational costs.

An integration system may include a routing element, which utilizes routing information to integrate source and target endpoints. A message-oriented middleware provider may be used to facilitate the integration of the source and target endpoints.

While the non-exhaustive examples herein are described with respect to Apache Camel middleware provider, any suitable middleware may be used. Apache Camel middleware ("Apache Camel") is an open source Java framework that focuses on making integration easier and more accessible to developers. Apache Camel middleware provides a large number (e.g., more than 100) of open source standard components which provide connectivity to a large set of systems. Apache Camel provides message-oriented middleware with a rule-based routing and mediation engine. The components provide uniform endpoint interfaces to which Apache Camel can send messages to or receive messages therefrom. Apache Camel components act as connectors to any third-party system, implementing enterprise integration patterns (EIP). The patterns may follow the flow of a message from one system to the next through channels, routing and transformations.

However, while a system may include a runtime worker node technology stack that is the same as, or substantially the same as, the middleware, it may not be used by the system due to security concerns. Additionally, while the system may include its own adapter elements to make use of the middleware, the adapter element may not be able to support the middleware, as the middleware components may support complex data types as component endpoint parameters, require custom bean injection, and extend different endpoint interfaces than those generated by the adapter elements.

One or more embodiments provide for modifying the middleware via a porting module, such that the modified middleware may be used to facilitate integration with a target endpoint system. Embodiments may provide for the target endpoint system to use more than 100 standard components, which cannot be otherwise built in a short time. For example, standard components often take more than five years to build. The porting module may receive the source code for the middleware component and transform the source code with additional metadata and other changes to form an endpoint-system compliant integration adapter. The integration adapter may then be deployed at runtime in workflows as a sender and/or receiver side integration adapter. In one or more embodiments, the porting module may build the integration adapter and integration flow, which may be specific to the integration platform. It is noted that the application server in FIG. 2 may be an integration platform where the ESA file is represented as an integration adapter and the application is represented as the integration flow which consumes the integration adapter in the flow steps. The integration platform will add an additional abstraction layer brought in the context of how the standard component may be used in the integration platform, and how the route may be generated/used in an intuitive way as an integration flow in the integration platform. The integration platform capabilities may be used to manage at least one of the life-cycle of the integration flow and the integration adapter. The integration platform may be used for: facilitating ease of use, better control of component/integration flow life cycle, monitoring and dependencies. In one or more embodiments, the porting module may intelligently embed transitive dependencies into the transformed source code. The porting module may also control integration adapter endpoint user interface generation logic (based on at least one of component source scan or manual user input). When a user supplies beans, they may also be injected into the transformed source code. As used herein, a "bean," also known as a "JavaBean," is a reusable class in Java programming language that may contain numerous objects. The JavaBean allows objects to be contained within a single object, called the "bean", which makes it easier to share and reuse the code. A bean may be a re-usable program building block that can be combined with other components to form an application. Any appropriate integration artifacts needed for the integration may be generated by the porting module. In a conventional Open Service Gateway Initiative (OSGI), (which, as commonly used, is a Java framework for developing and deploying modular software programs and libraries) runtime provisioned with, for example, Apache Camel, OSGI dependencies may be referenced in the Bean to be deployed and in an active state. Then a process will create an instance of a bean and register the instance to the Camel Context Service registry. In one or more embodiments, bean lookup may be bypassed in the camel context service registry by directly injecting bean creation source code. For example, a java source code may be generated directly from the bean and injected in the Apache Camel Standard Component classes where a registry will be looked for in the bean. As such, in one or more embodiments, when the modified component is executed (e.g., via a camel route), the bean will be viewed from the registry. It is noted that a benefit of bypassing the bean lookup may be for security purposes, as an integration platform may, in one or more embodiments, not allow any bean deployment.

In one or more embodiments, the porting module may build an integration platform with a specific abstraction layer. The use of the specific abstraction layer may make it easier for a user to use the middleware framework standard endpoint component in the integration platform by providing: custom user interfaces for component endpoint configuration; dependency injection/resolution by customizing the bundle manifest; and Enveloc Secure Archive (ESA) archive packaging for managing life-cycles of components in OSGI runtime. One or more embodiments may also simplify the use of the middleware by providing ready to consume integration flow, as well as monitoring aspects.

The porting module may also manage integration adapter build Enveloc Secure Archive (ESA) file generation and automatically deploy it to the integration runtime. The ESA file may represent a secure back-up of the integration adapter. An ESA archive format is defined in the Subsystems Service Specification as part of OSGi Enterprise R5. A subsystem archive is a ZIP file having an ESA extension and containing metadata describing the subsystem. The form of the metadata may be a subsystem or deployment manifest as well as any content resource files. The manifest may be optional and may be computed if not present.

FIGS. 1-7 include flow diagrams of processes 100 (FIG. 1), 400, 600 for generating an integration adapter 202 (FIG. 2), as well for deploying the integration adapter 202, according to some embodiments. Processes 100, 400, 600 may be executed by an application server 204 (FIG. 2) according to some embodiments. In one or more embodiments, the application server 204 may be conditioned to perform the processes 100, 400, 600, such that a processor 206/810 (FIGS. 2/8) of the system 200/800 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 1:
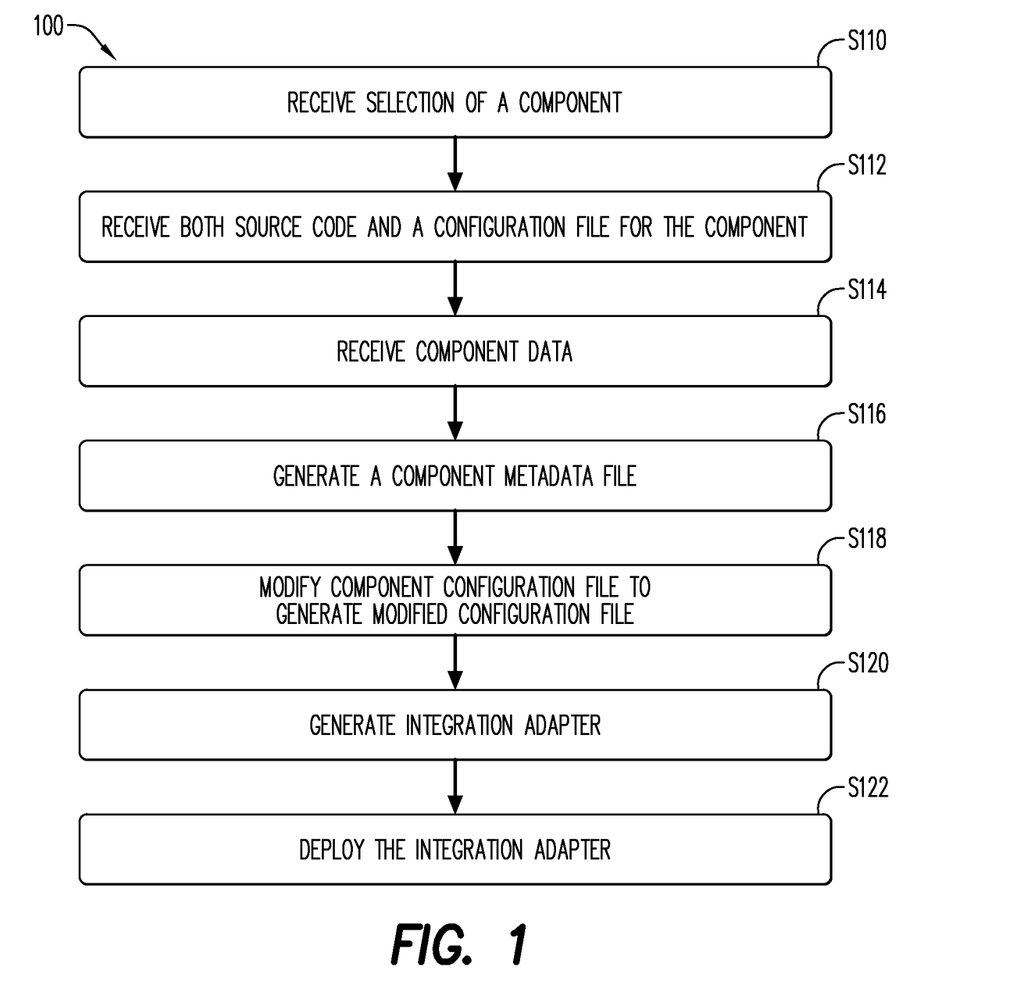
FIG. 1 is a flow diagram according to some embodiments.
Figure 2:
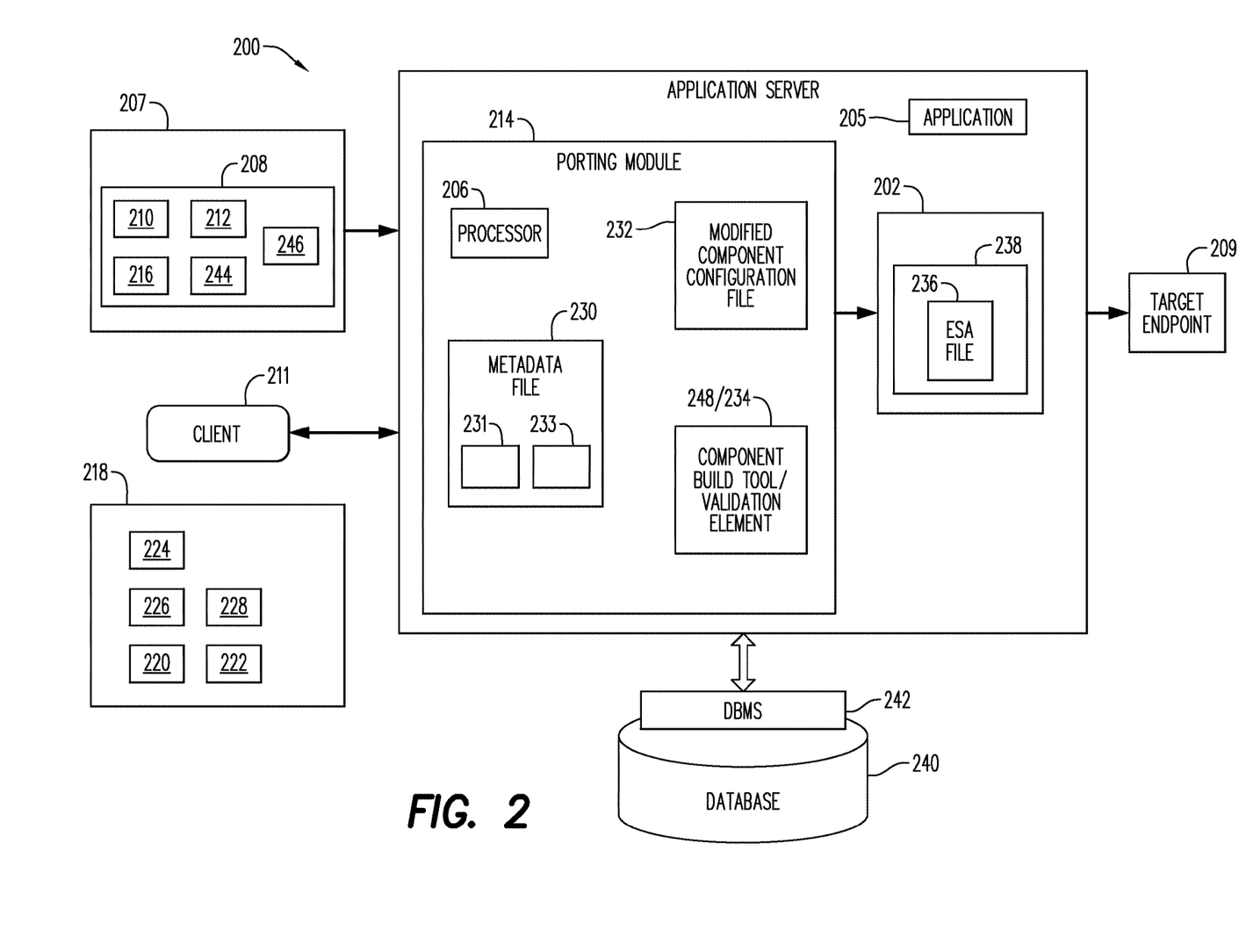
FIG. 2 is a block diagram of a system architecture according to some embodiments.

Initially, at S110, selection of a middleware component 208 ("component") is received. The selection may be received from a user (e.g., developer, integration consultant, etc.) or other system. The component 208 may be selected from a list (not shown) of components, entered in a text field, or via any suitable selection process. In one or more embodiments, receipt of the selection may include receipt of a component endpoint Uniform Resource Identifier (URI) 210. Then in S112, both a source code 212 for the selected component and a component configuration file 216 for the component 208 is retrieved. In one or more embodiments, the component may have an open source code, and a porting module 214 may use the received component endpoint URI 210 to retrieve the source code 212. In one or more embodiments, when the source code is retrieved, the component configuration file may also be retrieved.

In one or more embodiments, the component 208 may use a Project Object Model (POM) file or any other suitable configuration file to build the component. The component configuration file 216 may be an XML file that contains information about the component and configuration details used to build the component. Some of the configuration that may be specified in component the configuration file includes, but is not limited to, component dependencies, plugins or goals that may be executed, build profiles, component version, description, developers, mailing lists, etc.

Then in S114, component data 218 associated with the component 208 is received. It is noted that the order of steps S112 and S114 may not be limited to this order, and may be in any suitable order (e.g., component data is received directly after the component is selected, etc.). Component data 218 may include, but is not limited to, a component scheme 220, component URI first part 222, component sender UI parameter(s) 224, component receiver UI parameter(s) 226, datatype 228 for each parameter 228. As used herein, the component URI first part may be a string representation of the endpoint URI whose interpretation and usage changes from component to component.

A metadata file 230 is generated in S116. The metadata file 230 may include UI metadata 231 and metadata configuration 233, which may be data describing component configuration at one of a sender side (e.g., source endpoint) and a receiver side (e.g., target endpoint) of the integration adapter 214. As used herein, the terms "source endpoint" and "sender side" may be used interchangeably. As used herein, the terms "target endpoint" and "receiver side" may be used interchangeably. The metadata generation process 400 is described further below with respect to FIG. 4.

The component configuration file 216 for the selected component is modified in S118 to generate a modified component configuration file 232. The generation of the modified component configuration file process 600 is described further below with respect to FIG. 6. In one or more embodiments, the component configuration file 216 may be modified to embed transitive dependencies (e.g., any dependency that is induced by the elements that the component references directly), as well as a Java archive ("JAR") file (e.g., a collection of JAVA class files and associated metadata and resources as one single file). Modification of the component configuration file 216 may also add a validation element 234, which may in turn create an ESA file, which may be deployed at runtime. In one or more embodiments, modification of the component configuration file 216 may also include the addition of any dependency (e.g., jackson-databind) that may be provided by the user (e.g., as part of Configuration File Input). It is noted that in one or more embodiments, dependencies of the component are resolved from a parent POM file. It is noted that the parent POM file may be available in an opensource software service associated with the selected component. However, sometimes the parent POM file may not have details for some dependency component needed at the time of building the ESA archive. One or more embodiments provide for generating the missing information from an output of a generation tool (e.g., Maven ESA build plugin). Then, in one or more embodiments, the generated dependency may be passed via the configuration file input. In one or more embodiments, the component configuration file 216 may be modified such that the subsequently generated integration adapter 202 may be built from it's own source, independent of its parent configuration file. Unlike conventional middleware endpoint component sources that cannot be built separately without building a parent framework, one or more embodiments provide for the independent build of each component without dependency on a middleware framework, via the POM transformation (e.g., POM transformation may be used to change build management of each component to avoid dependency)

Next, in S120, the integration adapter 202 is generated. In one or more embodiments the integration adapter 202 is generated by modifying the source code 212 for the selected component with the metadata in the generated metadata file 230 and the modified configuration file 232.

In one or more embodiments, the generated metadata file 230 may be copied to a specific folder structure in the integration adapter. Then, the modified configuration file 232 may be copied to a base directory for the integration adapter. The original component configuration file 216 may then be backed up. The backed-up file may be referenced in case of any issues or errors during the build process. Continuing with the Apache Camel example, after the POM transformation step (e.g. see the configuration file modification process 600 in FIG. 6, as described below), a new MavenPOM.xml is present, as is the original Maven-POM.xml. The original MavenPOM.xml is backed-up.

Figure 3:
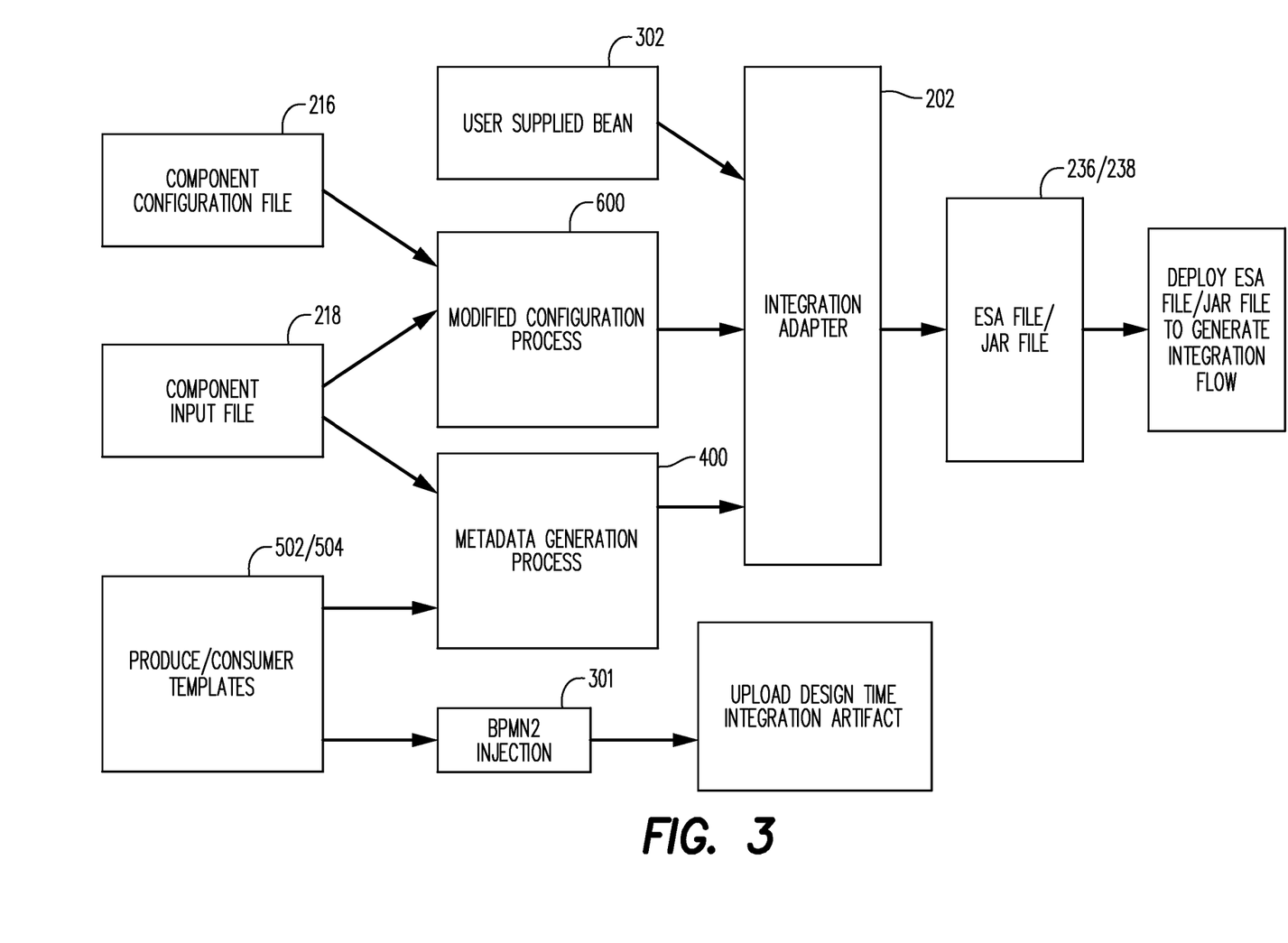
FIG. 3 is a block diagram of a process according to some embodiments.

In one or more embodiments, generation of the integration adapter 202 may also include the injection of a custom bean 302 (FIG. 3). During execution of the conventional component, a conventional bean may be looked upon by the component from the component context service registry to execute the application logic at a consumer/producer side of the component implementation. The inventors note that a challenge with conventional beans is that when the integration adapter is deployed, it cannot use the conventional bean to lookup data outside of the system for security reasons. More particularly, an integration platform may not allow random bean deployment due to security reasons, so the middleware service registry will not be able to have that bean, even though it is needed by the component. As such, any component needing that bean during execution of the component code will fail to lookup data, and eventually the execution of the component will fail. To resolve this conventional bean lookup, in one or more embodiments, a custom java source is generated and may be added to the integration adapter to bypass the conventional bean lookup. In one or more embodiments, to generate the custom java source, the bean declaration XML may be analyzed by the porting module 214 to generate relevant java source code. More particularly, in one or more embodiments, the custom java source (e.g., injectable java source code) may be created by analyzing a bean class, bean class arguments and properties from user-provided bean declaration XML.

As a non-exhaustive example, consider a mongodb component. The mongodb component may need a mongoClient configuration bean, which may provide mongodb connection details, including but not limited to host, port, username, password, database, etc. as part of the bean declaration. In one or more embodiments, the bean declaration may be transferred into Java source code, to form a generated Java bean. For example:

```
import com.mongodb.MongoClient;
import com.mongodb.MongoClientURI;
Mongo mongoClient = new MongoClient(new
    MongoClientURI("mongodb://35.243.167.31:27017/mydb"));
    db=mongoClient;
```

The above may be the java source code generated by the porting module 214 by analyzing the conventional bean class, bean class arguments and properties from a user-provided bean XML file.

As described above, with the conventional component, bean lookup may happen from the middleware context service registry. However, if used with the integrated adapter, the lookup may fail since the middleware context service registry is unavailable. To avoid failure, the customized bean 302 may be manually injected where bean lookup happens with the conventional component (for example, just before class object instance null check validation is done, or at any other suitable time). In one or more embodiments, the porting module 214 may scan the source code 212 of the component, and determine where a null check validation is done for, e.g., MongoClient object instance, and also determine a Mongo bean lookup in the middleware context service registry. Where these null check validations are found, in one or more embodiments, the custom generated java bean 302 may be injected into the code for the integration adapter just prior to that null check.

In one or more embodiments, after the integration adapter 202 is generated, the integration adapter may be validated. During validation, the porting module 214 may perform an integrity/correctness check for all artifacts by checking UI metadata, blueprint metadata and a configuration file. In one or more embodiments, the integrity/correctness check may check that the UI metadata generated is valid and has all of the required details including, but not limited to: 1. All sender/receiver parameters have valid data types; 2. Other information is present (e.g., component Scheme, name and vendor details); 3. Component endpoint configuration parameters for both sender/receiver sides are present. In one or more embodiments, the integrity/correctness check may also check for appropriate adapter details in the ADK properties file. Once the validation is successful (e.g., all the artifacts are correct) the porting module 214 may build the integration adapter 202 in an ESA file 236 or any other suitable storage. It is noted that if either any of the artifacts are missing or the artifacts are present but do not have all of the required data, then the validation may fail and so may the build process. In one or more embodiments, the porting module may build the ESA archive file. It is noted that the ESA archive file may also be referred to as the integration adapter.

Figure 7:
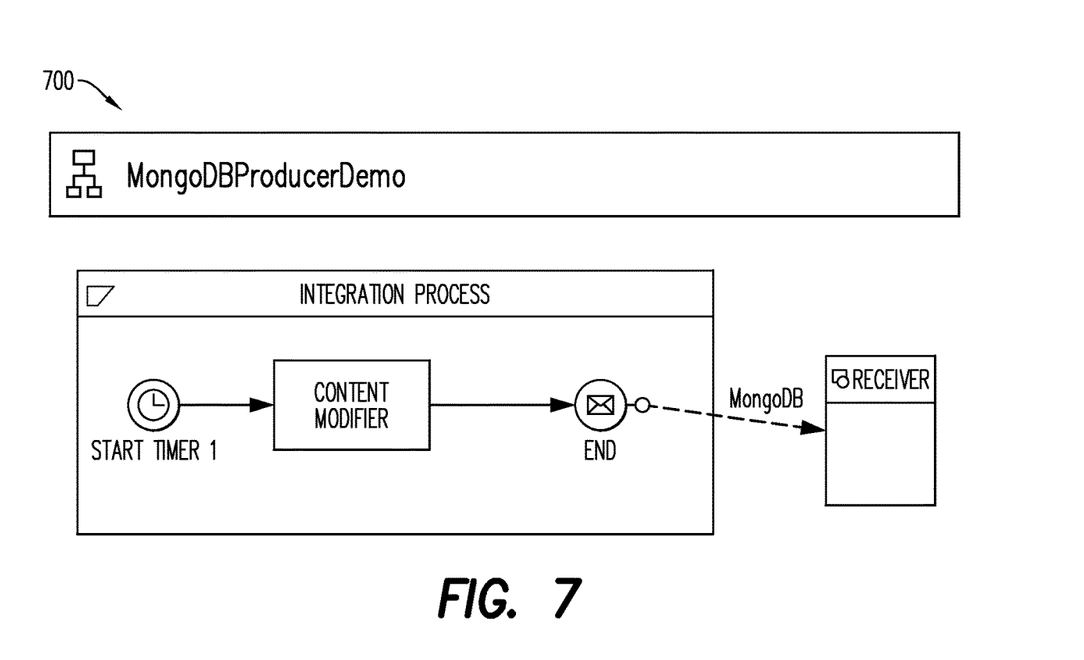
FIG. 7 is a non-exhaustive example of an integration flow according to some embodiments.
Figure 8:
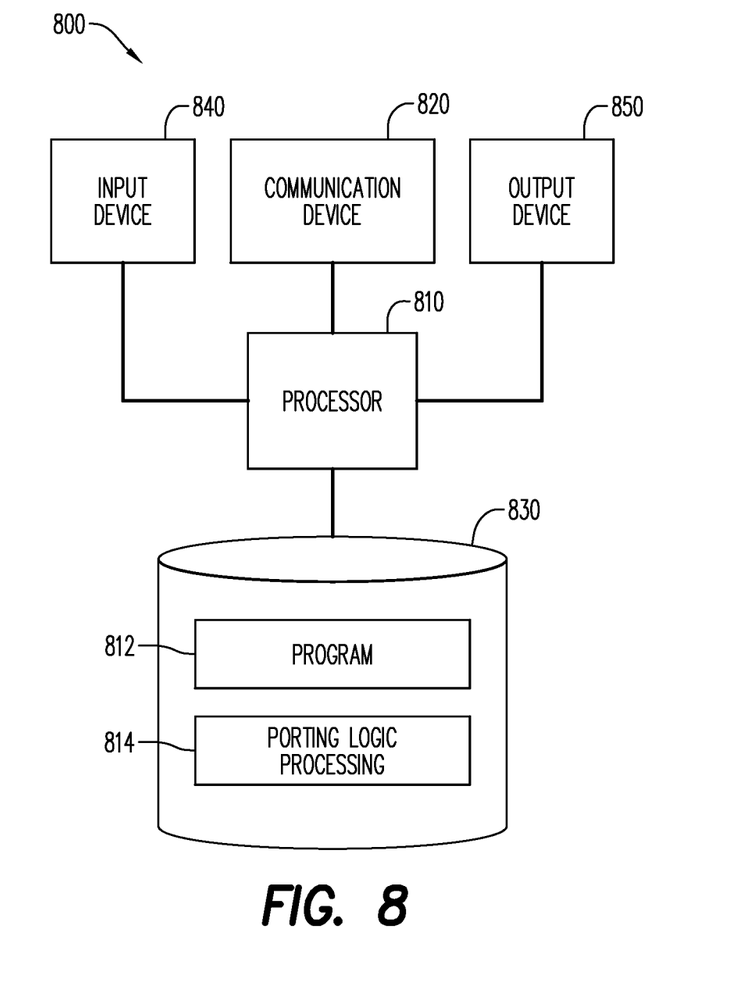
FIG. 8 is a block diagram of a system according to some embodiments.

Next, in S122, the integration adapter may be deployed by the porting module 214. The integration adapter 214 may be deployed to an integration runtime service, as part of a workflow 700 (FIG. 7).

Turning to FIG. 2, a block diagram of system architecture 200 according to some embodiments is provided. Embodiments are not limited to architecture 200.

Architecture 200 includes an application server 204, an application 205, a porting module 214, a middleware 208, a target endpoint 209, a user 211, processor 206, a datastore/database 240 and a database management system or service (DBMS) 242. In one or more embodiments, the porting module 214 may reside on the application server 204. Applications 205 may comprise server-side executable program code (e.g., compiled code, scripts, etc.) executing within application server 204 to receive queries from user (e.g., developer, integration specialist or other systems) and provide results to clients based on data of database 240 per the DBMS 242.

Application server 204 provides any suitable interfaces through which users may communicate with the porting module 214 or applications 205 executing on application server 204.

One or more applications 205 executing on server 204 may communicate with DBMS 242 using database management interfaces such as, but not limited to, Open Database Connectivity (ODBC) and Java Database Connectivity (JDBC) interfaces. These types of applications 205 may use Structured Query Language (SQL) to manage and query data stored in database 240.

DBMS 242 serves requests to retrieve and/or modify data of database 240, and also performs administrative and management functions. Such functions may include snapshot and backup management, indexing, optimization, garbage collection, and/or any other database functions that are or become known. DBMS 242 may also provide application logic, such as database procedures and/or calculations, according to some embodiments. This application logic may comprise scripts, functional libraries and/or compiled program code.

Application server 204 may be separated from, or closely integrated with, DBMS 242. A closely-integrated application server 204 may enable execution of server applications completely on the database platform, without the need for an additional application server. For example, according to some embodiments, application server 204 provides a comprehensive set of embedded services which provide end-to-end support for Web-based applications. The services may include a lightweight web server, configurable support for OData, server-side JavaScript execution and access to SQL and SQLScript.

Application server 204 may provide application services (e.g., via functional libraries) which applications 205 may use to manage and query the data of database 240. The application services can be used to expose the database data model, with its tables, hierarchies, views and database procedures, to clients. In addition to exposing the data model, application server 204 may host system services such as a search service.

Database 240 may store data used by at least one of: applications 205 and the porting module 214. For example, database 240 may store generated metadata and/or configuration data to generate the integration adapter.

Database 240 may comprise any query-responsive data source or sources that are or become known, including but not limited to a structured-query language (SQL) relational database management system. Database 240 may comprise a relational database, a multi-dimensional database, an eXtendable Markup Language (XML) document, or any other data storage system storing structured and/or unstructured data. The data of database 240 may be distributed among several relational databases, dimensional databases, and/or other data sources. Embodiments are not limited to any number or types of data sources.

In some embodiments, the data of database 240 may comprise one or more of conventional tabular data, row-based data, column-based data, and object-based data. Moreover, the data may be indexed and/or selectively replicated in an index to allow fast searching and retrieval thereof. Database 240 may support multi-tenancy to separately support multiple unrelated clients by providing multiple logical database systems which are programmatically isolated from one another.

Database 240 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 4:
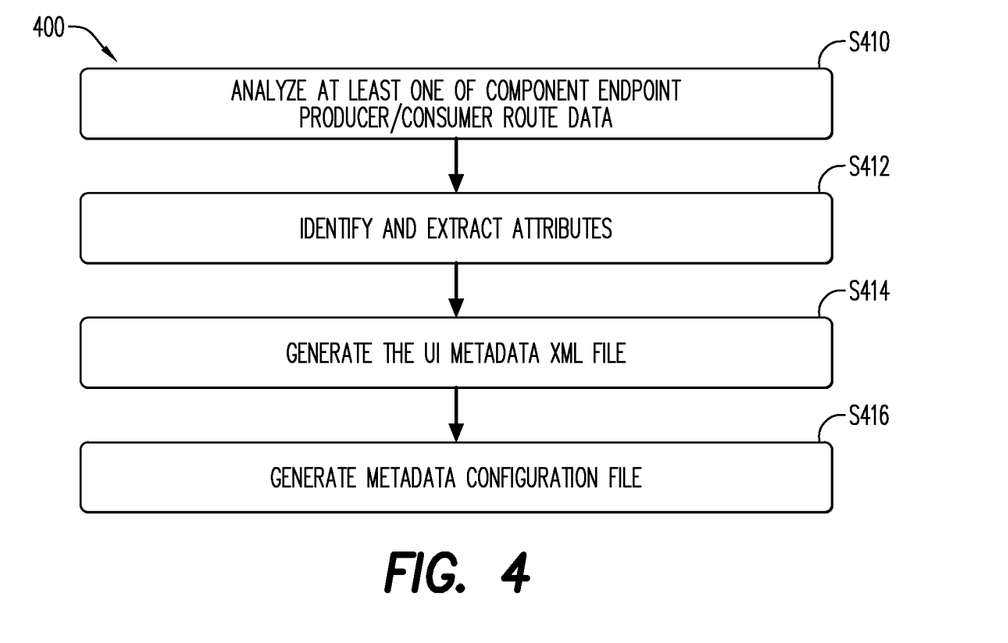
FIG. 4 is a flow diagram according to some embodiments.

Turning to FIG. 4, the metadata generation process 400, included in S116 is provided. As described above, this process 400 is related to generating UI metadata, which provides for configuration of the conventional component at a sender or receiver side of the integration adapter 202.

Figure 5A:
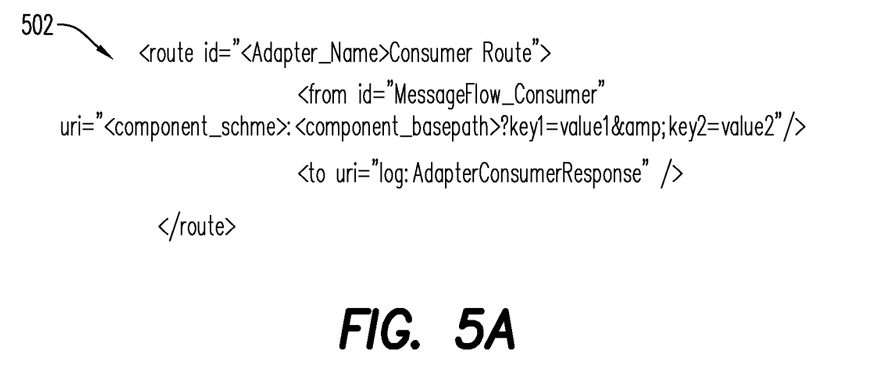
FIGS. 5A-5D are a non-exhaustive example according to some embodiments.
Figure 5B:
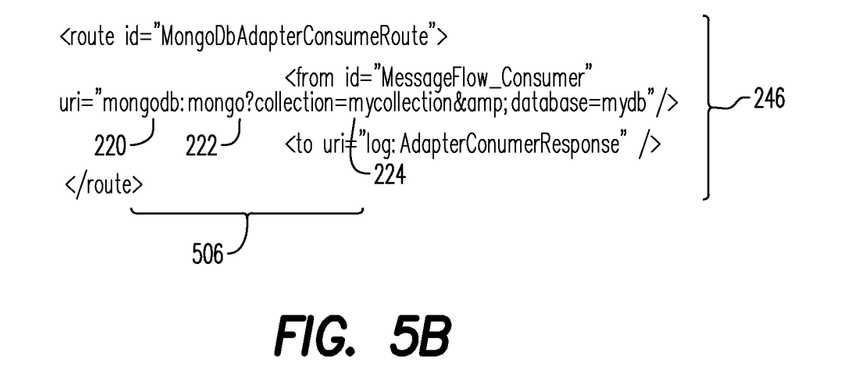
Figure 5C:
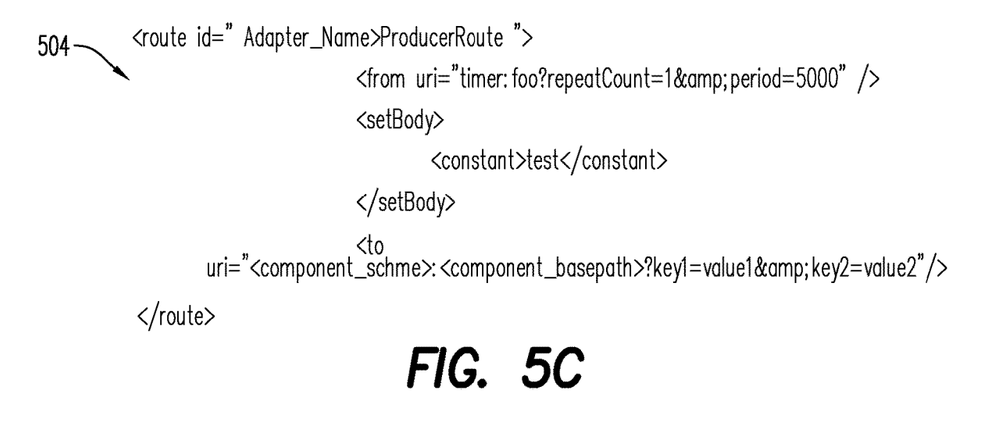
Figure 5D:
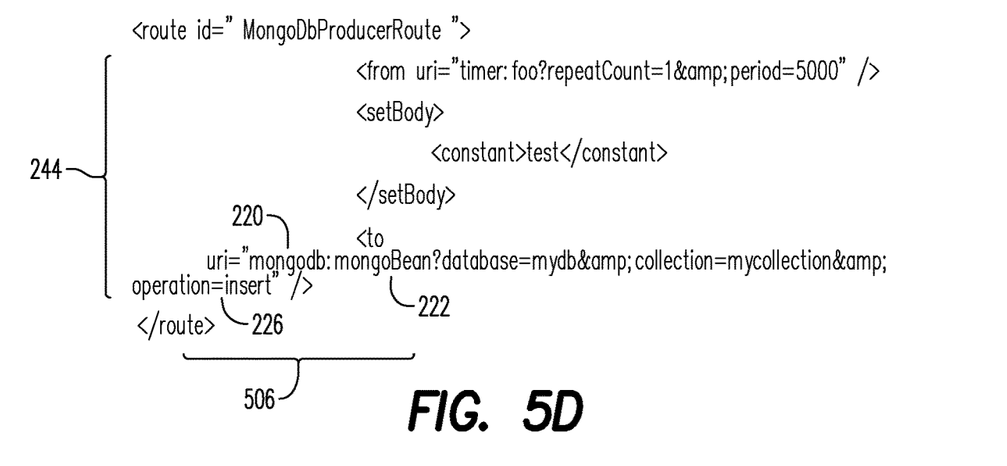

Initially, at S410, at least one of a component endpoint producer route data 244 and component endpoint consumer route data 246 are analyzed. In one or more embodiments, the component endpoint producer route data 244 and the component endpoint consumer route data 246 are received by the porting module 214 with the source code. In one or more embodiments, a template for the consumer route 502 (FIG. 5A) and producer route 504 (FIG. 5C) may be provided to the user 211 to receive component endpoint producer route data 244 data and/or component endpoint consumer route data 246. Continuing with the example described above, for a Mongodb component, the user may populate the consumer template 502 as shown in FIG. 5B and the producer template 504 as shown in FIG. 5D, with respective data 502, 504. In one or more embodiments, the analysis may provide information about the component ("component data" 218) including, but not limited to, component scheme 220, component URI first part 222, component sender UI parameters 224, component receiver UI parameters 226. Further, in one or more embodiments, each URI parameter may be analyzed (e.g., via any suitable data mining process) to determine its respective data type.

Continuing with the example shown in FIGS. 5B and 5D, for the consumer route in FIG. 5B, the "from" component endpoint URI element 222 may be selected for analysis, and for the producer route in FIG. 5D, the last "to" component endpoint URI element 222 may be selected for analysis. From the consumer route data 502 in FIG. 5B, component scheme 220, sender side endpoint parameters 224, sender side first URI part may be determined. From the producer route data 504 in FIG. 5D, component scheme 220, receiver side first URI part 222 and receiver side endpoint parameters 226 may be determined.

Then, in S412, attributes 506 ("component data 218") used in the generation of the metadata 230 may be identified and extracted from the consumer route data 502 and/or the producer route data 504.

Continuing with the example described above, for the configuration adapter sender side (e.g., consumer route), the following attributes—component scheme 220, URI first part 222 and sender endpoint parameters 224 were identified and extracted. In one or more embodiments, one or more parameter values for each of these attributes may be analyzed for data type validation to provide the parameter data type 228. As a non-exhaustive example, consider sender side parameter as: collection=mycollection; database=mydb; timeout=100. When the "mycollection", "mydb" and "100" parameter values are validated, the endpoint parameter collection may be a string datatype, database is also a string, and the timeout is an integer.

For the configuration adapter receiver side (e.g., producer route) 504, continuing with the example described above, the following attributes 506—component scheme 220, URI first part 222 and receiver endpoint parameters 226—were identified and extracted. As described above with the sender side, these attributes 506 may be scanned and their parameter values analyzed for data type validation to provide the parameter data type 228. In one or more embodiments, other attributes, including but not limited to, name, version, and vendor may be obtained.

Then in S414, the UI metadata XML file 231 is generated. The UI metadata XML file 231 may include the identified and extracted attributes. In one or more embodiments, each middleware component 208 may have an endpoint interface (not shown), where any client/consumer/third party system when the component is used in the integration flow, may send messages to them or receive messages from them. The endpoint interface may implement parameters which may provide component configuration. The middleware provider 207 (FIG. 2) may make use of URIs in the component to refer to endpoints in the message route defined in the templates. As such, one or more embodiments allow for users to have interactive UIs to populate endpoint configuration parameters during development of an integration work flow.

It is noted that, in one or more embodiments, to use the component in a sender or receiver side of an integration work flow, component configuration may need to be provided. This component configuration may be provided using a user interface of the system associated with the target endpoint 209 (e.g., the component configuration may be provided by the integration platform). The system associated with the target endpoint may receive a metadata XML file 231, which may define the component endpoint parameters and other details related to component metadata (such as scheme, name, vendor etc.). The UI metadata XML file 231 may include 1. endpoint parameters for both sender and receiver side, with their data type and default value details, and 2. Integration adapter metadata details, including but not limited to, component name, vendor, scheme, version.

Next, in S316, a metadata configuration file 233 is generated. As a non-exhaustive example, for a COAP component, the metadata configuration file may include the following details: #Propertiesfile, #WedDEC 12 13:42: 10IST2018; Adapter-Name=CoAP; Adapter-Vendor=ApacheCamel; Enable-Maven=true; Adapter-ID=CoAP; Adapter-Version=2.17.4. In one or more embodiments, the porting module 214 may generate the metadata configuration file 233 using the data in the UI metadata XML file 231. In one or more embodiments, the metadata configuration file 233 may include data including, but not limited to, the component name, version, vendor details, etc.

Figure 6:
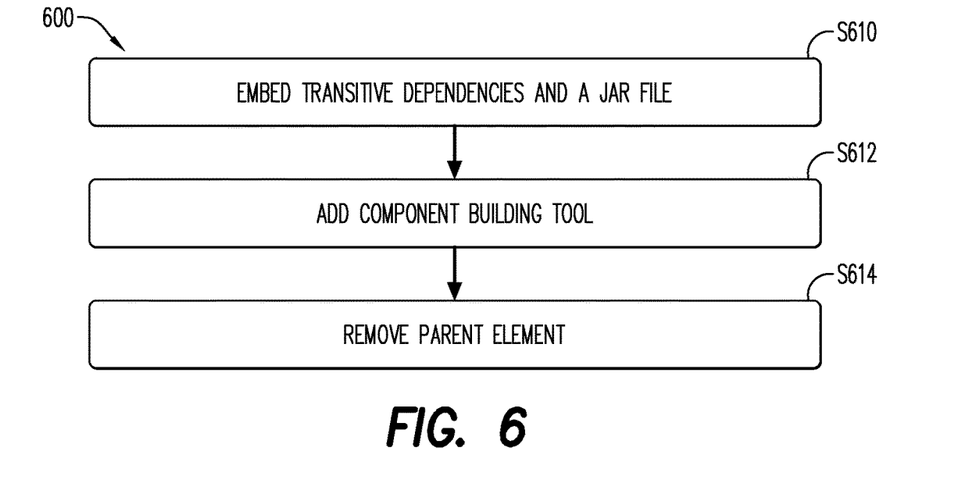
FIG. 6 is a flow diagram according to some embodiments.

Turning to FIG. 6, the configuration file modification process 600 to generate the modified configuration file 232, included in S118 is provided. In one or more embodiments, the component 208 may use a project object model (POM) file that includes component and configuration details, or any other suitable file, to build the component 208. It is noted that conventionally, the component may be built by a component building tool. The POM file may be in an XML format. The focus of the process 600 may be to modify the component configuration file 216 (e.g., POM file) to support the following aspects of one or more embodiments: 1. Embed transitive dependencies along with a configuration adapter JAR file; 2. Add the component building tool 248 to the configuration file. The component building tool 248 may validate the artifacts generated in process 400, and may create an ESA file 236 which maybe deployed at runtime; 3. Dynamically add any user-provided dependencies; and 4. Prepare the modified configuration file 232 to build the integration adapter 214 from its own source, independent of the component.

Initially, at S610 transitive (e.g., third party) dependencies are embedded in a component endpoint JAR file (where instructions for this may be in component POM.XML file). In one or more embodiments, the adapter=ESA (middleware endpoint components (standard/custom) jar+Delta (ADK metadata+ADK component monitoring bundle)+subsystem manifest), where the ESA is a subsystem file. When the configuration file for the component includes third party dependencies, those dependencies may be provisioned (e.g., in the directory, and are loaded by the runtime during startup, using its configuration file or deployed using a hot deployment or OSGI console) for a runtime environment if the component has to get resolved to be in an active state. For example, in an OSGI runtime environment (e.g., felix/karaf/Equonix), if an OSGI bundle has to work, then its dependencies need to be provisioned in run-time in advance. To provision the dependencies, in one or more embodiments, the dependencies may be embedded as part of the integration adapter JAR file itself, by modifying the component configuration file (POM file) 216 with a transitive attribute (e.g., "Embed-Transitive=true") and also specifying the resolution requirement as "optional," so that the integration adapter 214 does not look for import dependencies, and is able to change its state from Installed state to Resolved state and Active state easily in the runtime environment.

As such, in one or more embodiments, when the sender/receiver route is executed during runtime, per execution of the integration adapter 214, and a specific code is called in the integration adapter 214 which uses some import dependency, a Java class loader (or other tool) may resolve this and locate the integration adapter JAR file 238 storing the dependency easily, as all third party JAR files may already be embedded in the modified configuration file.

It is noted that in one or more embodiments, when the user wants to add a specific dependency to the modified configuration file (which is not the transitive dependency), the user may provide dependency details to the configuration file. As a non-exhaustive example: customDepenency—[{"groupId":"com.fasterxml.jackson.core", "artifactId": "jackson-databind", "version": "2.7.8"}]

In one or more embodiments, the porting module 214 may inject this custom dependency into the component configuration files while modifying it to be the modified configuration file 230.

Then, in S612, the component building tool 248 is added to the modified configuration file 230. Once the integration component 214 is ready to be built (after completing the artifact creation process described above with respect to FIG. 4), the component building tool 248 may validate the presence and correctness of the artifacts, such as the UI metadata XML, file 231 and metadata configuration file 233.

In one or more embodiments, the component building tool 248 may be a validation element that may determine whether the transformed endpoint project source code is compliant with any necessary requirements, including, but not limited to Integration Platform Adapter development kit specifications. If compliant, the component building tool 248 may generate an ESA file 236, which may be ready to deploy at the target system (e.g., on a runtime worker node) as the integration adapter 214.

Next, in S614, a parent element tag (e.g., a parent element tag in Pom.xml relates to Parent Project details for merging and other purposes) may be removed from the modified configuration file 230. As used herein, the terms "parent element" and "parent element tag" may be used interchangeably. The inventors note that by removing the parent element tag, the integration adapter 214 may be built independently, using the modified configuration file 230, without having to include the parent configuration file. As such, individual components may be built separately without the need of a complete parent project to be built first. Continuing with the non-exhaustive example, a complete camel framework source code need not be built, and the component being received as input will only be built. In one or more embodiments, version information for each dependency in the modified configuration file 230 may be updated by including the information from the parent element. In one or more embodiments, in the modified configuration file, scope information for dependencies may be updated based on the corresponding information in the modified configuration file, as the scope information may control the information to be embedded while building the integration adapter 214.

Turning to FIG. 7, once the integration adapter 214 is generated, it may be deployed (e.g., by deploying the ESA file) to a runtime environment as shown in FIG. 7. The integration flow 700 shown in FIG. 7, is generated for the example MongoDB use case described above. Once deployed, the integration adapter 214 may be viewed under "deployed artifacts" in an integration server (e.g., workflow process) tenant node explorer, and it may be used in the workflow process ("integration flow") 700.

In one or more embodiments, an integration flow 700, such as that shown in FIG. 7, may be derived from the middleware consumer/producer route template that was input as part of the source code in S212. For example, the middleware templates described with respect to FIGS. 5A-D, may be extended (i.e., modified). It is noted that the non-exhaustive examples in FIGS. 5A-5D are input samples for consumer or producer template use cases with a standard component, which may need to be ported or transformed for the integration platform. The input in FIGS. 5A-5D may be the input for the tool to generate the integration adapter and the integration flow. In one or more embodiments, BPMN2 definitions define or describe the integration flow (e.g., stores the integration flow pipeline steps), whereas the integration adapter makes a step in the integration flow either at the sender part or the receiver part. BPMN2 injection may generate an integration flow, which may be used to showcase the use of the integration adapter in the integration platform. In one or more embodiments this modification may include generating a design time integration flow artifact for the component endpoint consumer route 502 and generating a design time integration flow artifact for the component endpoint producer route 504.

The generation of the design time integration flow artifact for the endpoints may help a user of an integration tool use the integration adapter 214, which has been deployed, since the component configuration is being directly taken from the component endpoint route URI. BPMN2 injection may use information regarding component endpoint parameters, which were captured in the initial generating UI metadata from component endpoint URI steps.

To effect this extension of the middleware template, one or more component endpoint consumer route integration flow base template design time BPMN2 definitions may be loaded from a definition file. In one or more embodiments, the new BPMN2 collaboration participant, which is of endpoint sender type, may be added. Then a new BPMN2 message flow for the newly added endpoint sender collaboration participant is added. The message flow may contain integration adapter general details and connection details (component endpoint parameters), which may be rendered on a sender side of the component UI. Next, a new BPMN diagram shape for the endpoint sender BPMN2 collaboration participant is added. This may be a sender endpoint shape defining as a BPMN2 diagram object. In one or more embodiments, the integration adapter may be used in the integration flow at the sender side or the receiver side. When used at the sender side, there may be some BPMN2 specifications that need to be added to accommodate the adapter, including but not limited to BPMN2 Participant, BPMN2 Message flow and BPMN2 Diagram (BPMN2 Shape, BPMN2 Edge link). A new BPMN diagram edge for the message flow is added and the changes to the middleware template are completed and saved. This step may connect the BPMN2 endpoint sender participant message flow to a start event in the integration flow by providing an edge link. Next an integration flow design time artifact bundle manifest for the integration flow naming requirement is modified. It is noted that the integration flow design time artifact may be modified to ensure it has naming as per the deployed integration adapter showcase requirement. Finally, the modified template may be repackaged as a zip archive and uploaded to the design time environment. In one or more embodiments, the zip archive may be uploaded using Open Data protocol (OData) Application Programming Interfaces (API)s. The same steps are executed for extending the middleware template for the component endpoint producer route integration flows, with the "sender type" replaced with "receiver type" and "sender collaboration participant" replaced with "receiver collaboration participant"

FIG. 7 is a block diagram of apparatus 700 according to some embodiments. Apparatus 700 may comprise a general-or special-purpose computing apparatus and may execute program code to perform any of the functions described herein. Apparatus 700 may comprise an implementation of one or more elements of system 200. Apparatus 700 may include other unshown elements according to some embodiments.

Apparatus 700 may comprise a general- or special-purpose computing apparatus and may execute program code to perform any of the functions described herein. Apparatus 700 may comprise an implementation of one or more elements of system 200. Apparatus 700 may include other unshown elements according to some embodiments.

Apparatus 700 includes a porting processor 710 operatively coupled to communication device 720, data storage device 730, one or more input devices 740, one or more output devices 750 and memory 760. Communication device 720 may facilitate communication with external devices, such as application server 204. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to manipulate graphical user interfaces and to input information into apparatus 700. Output device(s) 750 may comprise, for example, a display (e.g., a display screen) a speaker, and/or a printer.

Data storage device/memory 730 may comprise any device, including combinations of magnetic storage devices (e.g., magnetic tape, hard disk drives and flash memory), optical storage devices, Read Only Memory (ROM) devices, Random Access Memory (RAM) etc.

The storage device 730 stores a program 712 and/or porting platform logic 714 for controlling the processor 710. It is noted that program 712 and/or porting platform logic 714 may also be stored and executed from an application server or from any other environment (e.g., software architecture) that can execute software instructions. The processor 710 performs instructions of the programs 712, 714, and thereby operates in accordance with any of the embodiments described herein, including but not limited to process 100. The executable instructions of the programs 712, 714 represent the executable instructions of the software architecture, including implementation of the methods, modules, subsystems and components and so forth described herein and may also include memory and/or storage modules . . . etc.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

The foregoing diagrams represent logical architectures for describing processes according to some embodiments, and actual implementations may include more, or different, components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 200 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method comprising:
   receiving selection of a component at a porting module;
   retrieving a source code for the selected component and a component configuration file for the selected component;
   receiving component data associated with the component;
   generating metadata associated with the received component based on the received component data, wherein generating metadata further comprises:
   identifying at least one attribute for an endpoint of the selected component;
   extracting the at least one identified attribute; and
   generating a user interface (UI) metadata file and a metadata configuration file with the extracted at least one identified attribute;
   modifying the component configuration file of the selected component to generate a modified configuration file;
   generating an integration adapted by modifying the retrieved source code for the selected component with the generated metadata and the modified configuration file; and
   deploying the integration adapter.

2. The method of claim 1, further comprising:
   injecting a custom bean in the transformed source code.

3. The method of claim 1, further comprising:
   validating the generated integration adapter.

4. The method of claim 1, further comprising:
   generating a design time integration flow using the deployed integration adapter.

5. The method of claim 4, further comprising:
   executing the design time integration flow.

6. The method of claim 1, wherein the component configuration file is an XML file.

7. The method of claim 6, wherein modifying the component configuration file of the selected component further comprises:
   embedding one or more transitive dependencies in the modified configuration file;
   adding a validation element to the configuration file; and
   removing a parent element from the configuration file.

8. The method of claim 1, wherein the at least one attribute is at least one of a component scheme, a Uniform Resource Identifier (URI), sender endpoint parameter, receiver endpoint parameter, component name, component vendor, component version.

9. A system of comprising:
   a target endpoint;
   a component providing a uniform endpoint interface to the target endpoint;
   a porting module;

a porting processor in communication with the porting module and operative to execute processor-executable process steps to cause the system to:
receive selection of the component;
retrieve a source code for the selected component and a component configuration file for the selected component;
receive component data associated with the component;
generate metadata associated with the received component based on the received component data, wherein generating metadata further comprises process steps to cause the system to:
identify at least one attribute for an endpoint of the selected component;
extract the at least one identified attribute; and
generate a User Interface (UI) metadata file and a metadata configuration file with the extracted at least one identified attribute;
modify the component configuration file of the selected component to generate a modified configuration file;
generate an integration adapter by modifying the retrieved source code for the selected component with the generated metadata and the modified configuration file;
validate the generated integration; and
deploy the integration adapter.

10. The system of claim 9, further comprising process steps to cause the system to:
inject a custom bean in the transformed source code.

11. The system of claim 9, further comprising process steps to cause the system to:
generate a design time integration flow using the deployed integration adapter; and
execute the design time integration flow.

12. The system of claim 9, wherein the component configuration file is an XML, file.

13. The system of claim 12, wherein modifying the component configuration file of the selected component further comprises process steps to cause the system to:
embed one or more transitive dependencies in the modified configuration file;
add a validation element to the configuration file; and
remove a parent element from the configuration file.

14. The system of claim 9, wherein the at least one attribute is at least one of a component scheme, a Uniform Resource Identifier (URI), sender endpoint parameter, receiver endpoint parameter, component name, component vendor, component version.

15. A non-transitory computer-readable medium storing program instructions executed by a processor of a computer system having memory, the medium comprising instructions for causing the processor to perform:
receiving selection of a component at a porting module;
retrieving a source code for the selected component and a component configuration file for the selected component;
receiving component data associated with the component;
generating metadata associated with the received component based on the received component data, wherein generating metadata further comprises instructions to cause the processor to perform:
identifying at least one attribute for an endpoint of the selected component;
extracting the at least one identified attribute; and
generating a User Interface (UI) metadata file and a metadata configuration file with the extracted at least one identified attribute;
modifying the component configuration file of the selected component to generate a modified configuration file;
generating an integration adapter by modifying the retrieved source code for the selected component with the generated metadata and the modified configuration file; and
deploying the integration adapter.

16. The medium of claim 15, wherein modifying the component configuration file of the selected component further comprises instructions to cause the processor to perform:
embedding one or more transitive dependencies in the modified configuration file;
adding a validation element to the configuration file; and
removing a parent element from the configuration file.

17. The medium of claim 15, wherein the at least one attribute is at least one of a component scheme, a Uniform Resource Identifier (URI), sender endpoint parameter, receiver endpoint parameter, component name, component vendor, component version.

* * * * *